United States Patent [19]

Mori

[11] Patent Number: 4,738,011
[45] Date of Patent: Apr. 19, 1988

[54] METHOD OF MANUFACTURING COMPOSITE SLIDING MATERIAL

[75] Inventor: Sanae Mori, Nagoya, Japan

[73] Assignee: Daido Metal Company Ltd., Nagoya, Japan

[21] Appl. No.: 910,857

[22] Filed: Sep. 24, 1986

Related U.S. Application Data

[63] Continuation of Ser. No. 761,030, Jul. 31, 1985, abandoned.

[30] Foreign Application Priority Data

Aug. 31, 1984 [JP] Japan ................... 59-180438

[51] Int. Cl.$^4$ ............................................. B21D 53/10
[52] U.S. Cl. ................... 29/149.5 S; 29/458;
29/527.2; 29/527.7; 72/700
[58] Field of Search .............. 29/149.5 S, 527.1, 527.2,
29/527.3, 527.5, 527.6, 527.7, 458, 17 R, 18;
72/700, 258; 264/245, 241

[56] References Cited

U.S. PATENT DOCUMENTS

| | | | |
|---|---|---|---|
| 2,490,543 | 12/1949 | Robertson et al. | 29/527.2 |
| 3,340,716 | 9/1967 | Funk | 29/527.7 |
| 3,350,763 | 11/1967 | Kingsbury et al. | 29/149.5 S |
| 3,513,520 | 5/1970 | Vandervell | 29/149.5 S |
| 3,833,983 | 9/1974 | Baker et al. | 29/149.5 S |
| 3,871,926 | 3/1975 | Steigelman | 29/527.2 |
| 3,997,099 | 12/1976 | Morisaki | 29/149.5 S |
| 4,121,928 | 10/1978 | Mori | 29/149.5 S |

FOREIGN PATENT DOCUMENTS

| | | | |
|---|---|---|---|
| 27197 | 8/1973 | Japan . | |
| 923445 | 4/1963 | United Kingdom | 29/149.5 S |
| 1245833 | 9/1971 | United Kingdom . | |

Primary Examiner—Howard N. Goldberg
Assistant Examiner—Irene Cuda
Attorney, Agent, or Firm—Browdy and Neimark

[57] ABSTRACT

A method of producing a composite sliding material having a sliding portion with a sliding surface is disclosed. A base material billet for the sliding portion is prepared and then at least half of the outer peripheral surface of the base material billet is covered by a protecting material while leaving the surface of the billet, which is to become the sliding surface of the finished composite sliding material, as an exposed portion which is not covered by the protecting member. The base material billet and the protecting material are then extruded simultaneously. The composite sliding material may be made thinner by means of rolling as occasion demands. It is also possible to subject the sliding material to heat treatment before and/or after extrusion, if necessary. A composite sliding material may be produced by pressure-bonding a hard support material such as steel to the protecting material which is used in this case as an adhesive layer.

8 Claims, 4 Drawing Sheets

STEP OF EXTRUSION

STEP OF FORMING
FIG. 1-A
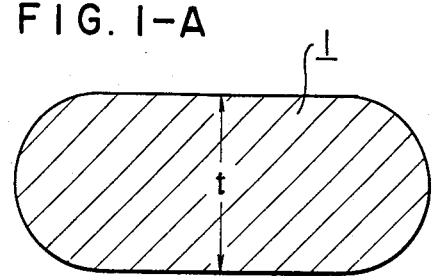
STEP OF COVERING
FIG. 1-B
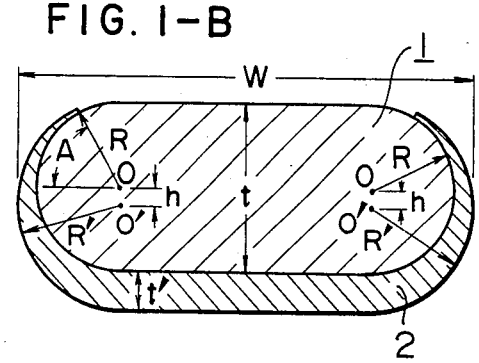
STEP OF EXTRUSION
FIG. 1-C
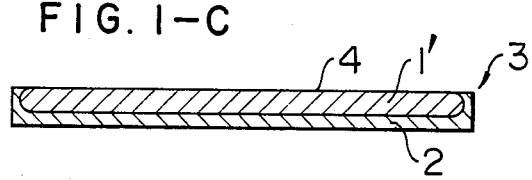
STEP OF ROLLING
FIG. 1-D
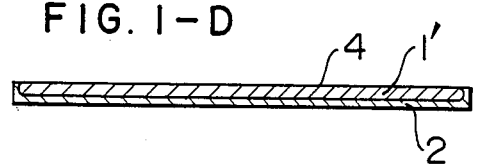
STEP OF ROLL BONDING
FIG. 1-E

FIG. 4-A
STEP OF FORMING
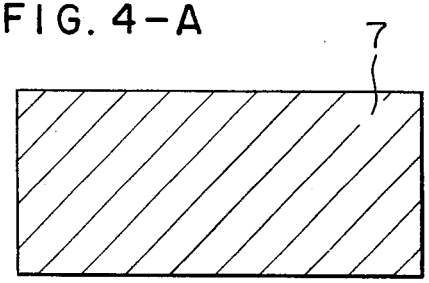
FIG. 4-B
STEP OF COVERING
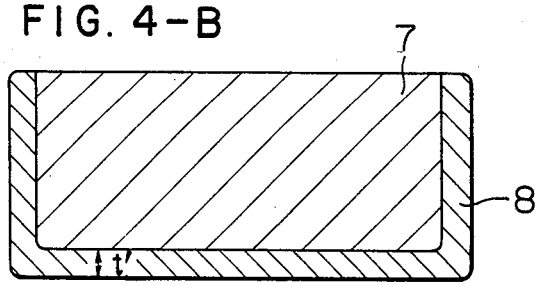
FIG. 4-C
STEP OF EXTRUSION
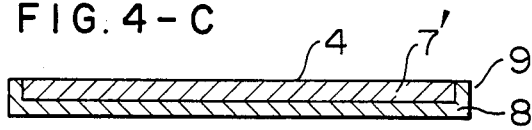
FIG. 4-D
STEP OF ROLLING
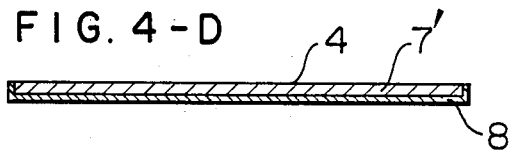
FIG. 4-E
STEP OF ROLL BONDING
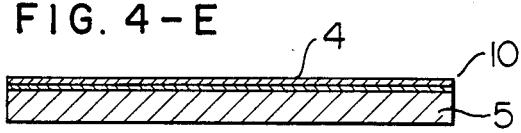

FIG. 5
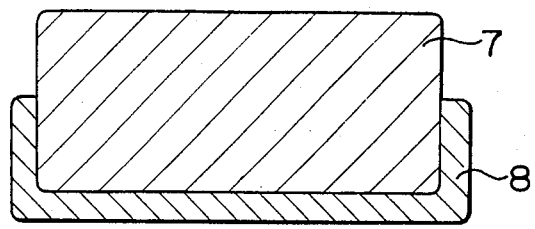
FIG. 6
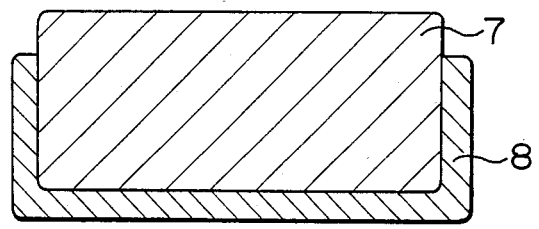
FIG. 7-A
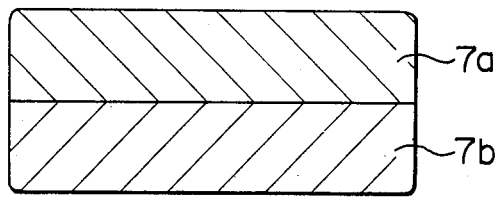
FIG. 7-B
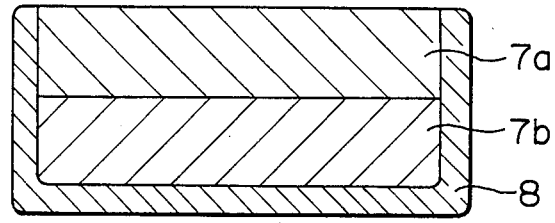

METHOD OF MANUFACTURING COMPOSITE SLIDING MATERIAL

This application is a continuation, of application Ser. No. 761,030, filed July 31, 1985, now abandoned.

BACKGROUND OF THE INVENTION

This invention relates to a method of manufacturing a composite sliding material which is usable for the sliding portion of or the rotating portion of various industrial machines and automobile etc.

A method of producing a bimetal strip (hereinunder referred to as a composite sliding material) which is necessary for making a plain bearing or the like for automobiles is disclosed in Japanese Patent Publication No. 27197/1973 (as a prior art for producing a composite sliding material to be employed in such a usage). This literature shows a method of producing a composite sliding material which method comprises the steps of casting or inserting a billet for the sliding portion, which is formed of alloy of aluminum and tin, into a sleeve type protecting material which is formed of pure aluminum and thereafter extruding both simultaneously, as well as a method of producing a composite sliding material wherein a steel material is pressure-bonded to the protecting material of the composite sliding material which in this case serves as an adhesive.

The conventional methods of producing a composite sliding material including the above-described methods have the following defects:

The composite sliding material which has been extruded is entirely enveloped by a protecting material of pure aluminum and in order to form this sliding material to a finished composite sliding material product, the step of cutting the aluminum protecting material is necessary for the purpose of exposing the sliding portion covered by the protecting material. This fact leads to an increase in manufacturing costs. Furthermore, in the case of producing the composite sliding material by extruding a plane billet base material and a plane protecting material which are merely arranged in parallel and in contact with each other, the sliding material obtained by the extrusion is apt to crack at the end portions along the interface.

SUMMARY OF THE INVENTION

Accordingly it is an object of the invention to provide a method of manufacturing a composite sliding material in which the above-described defects of the conventional methods are eliminated.

To achieve this aim, this invention provides a method of producing a composite sliding material having a sliding portion with a sliding surface which comprises the steps of: Preparing a base material billet for the sliding portion; covering at least ½ of the outer peripheral surface of the base material billet with a protecting material while leaving a billet surface which is to become the sliding surface of a composite sliding material as an exposed portion which is not covered by the protecting member; and extruding the base material billet and the protecting material simultaneously. A composite sliding material according to the invention may be made thinner by means of rolling as occasion demands. In addition, it is possible to subject the sliding material to heat treatment before or after extrusion, if necessary.

It is also possible to produce a modified form of this composite sliding material by pressure-bonding a hard support material such as steel to the protecting material which is used as an adhesive layer.

Since, in the method according to the invention, the surface of a base material billet which surface corresponds to the sliding surface of a composite sliding material is not covered by a protecting material but is left exposed, this method involves no step of cutting the aluminum protecting material unlike those obtained by the conventional methods. In addition, the protecting material which covers more than ½ of the outer peripheral surface of the billet material which forms the sliding portion prevents the occurrence of end cracking along the interface between the base material billet and the protecting material.

The above and other objects, features and advantages of the present invention will become clear from the following description of the preferred embodiments thereof, taken in conjunction with the accompanying drawings.

BRIEF DESCRIPTION OF THE DRAWINGS

FIGS. 1(a), 1(b), 1(c), 1(d) and 1(e) are sectional views of a first embodiment of a manufacturing processes embodying the invention;

FIGS. 4(a), 4(b), 4(c), 4(d) and 4(e) are sectional views of billet showing steps of manufacturing processes of a fourth embodiment;

FIGS. 5 and 6 are sectional views of billet showing the covering processes of fifth and sixth embodiments, respectively, which are modifications of the covering process shown in FIG. 4(b) of the fourth embodiment; and FIGS. 7(a), 7(b) are sectional views of billet showing the process of a seventh embodiment, which are modifications of the steps shown in FIGS. 4(a) and 4(b) of the fourth embodiment.

DESCRIPTION OF THE PREFERRED EMBODIMENT

Figure 2:
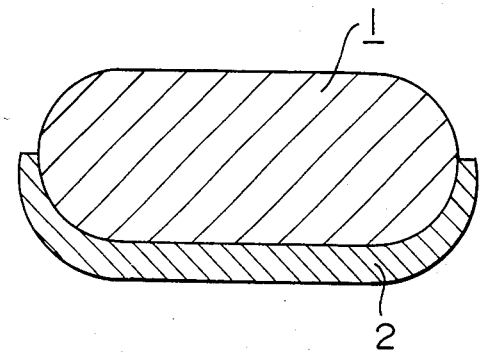
FIGS. 2 and 3 are sectional views of second and third embodiments of the method embodying the invention, respectively, which are modifications of the covering process shown in FIG. 1(b) of the first embodiment.

Referring first to FIGS. 1(a), 1(b), 1(c), 1(d) and 1(e) which show the manufacturing processes of a first embodiment, a base material billet 1 for a sliding portion which is formed of aluminum alloy is prepared by casting or sintering. The width (W) of the billet is about 150 to 250 mm, and its length is 150 to 300 mm. The side end portions have semicircular cross sections with a radius (R) of about 20 to 50 mm and the thickness (t) of the billet is 40 to 100 mm. A protective member 2 formed of pure aluminum or aluminum alloy is provided by extrusion or casting around a portion of the billet which exceeds half of the outer peripheral surface and which includes a portion of each of the semicircular side ends which falls within the range defined by each of the angles of circumference (A) which are formed between the horizontal line passing through the center O of the radii of the semicircular end portions and the radius (R) drawn through the extremity of the protective member 2 and which angle do not exceed 90 degrees. Both the billet 1 and the protecting material 2 are extruded simultaneously (at the extrusion ratio of 10 to 50 times, namely, the reduction of area is 1/10 to 1/50) to obtain a composite sliding material 3 (extruded product) of 2 to 5 mm in thickness and of 150 to 200 mm in width. The thickness t' of the bottom portion of the protecting material is 10 to 20 mm, and each of the inner side end portions thereof has approximately the same configuration as that of the billet while the outer end portion has an arcuate configuration with a 20 to 60 mm radius R', the eccentric center O', thereof being spaced a distance (h) of 5 to 15 mm apart from the center O in the vertical downward direction. Heat treatment is effected if necessary, regarding the billet and the protecting material before or after extrusion (at a temperature of not higher than the solidification starting temperature of the aluminum alloy). The referential numeral 4 denotes what is called the sliding surface of the sliding portion.

The product 3 is next rolled to obtain a thin plate having a thickness required, and this thin protecting material 2 of pure aluminum or aluminum alloy is then placed on a hard support member 5 which serves as a backing metal such as a steel plate. They are finally bonded together under pressure to obtain a composite sliding material 6. Both ends of the extruded product had been cut away before pressure-bonding. The specific compositions of both the sliding (bearing) material and the material for adhesive layer (corresponding to the above-described protecting material) used in producing the composite sliding material are disclosed in the specification of U.S. Pat. No. 4,361,629 and British Pat. No. 2,080,337. That is, the compositions of the sliding material are shown in Table 1.

proximately rectangular cross section which is formed of aluminum-based alloy by casting or sintering is covered by a protecting material 8 of 10 to 20 mm in thickness (t') of pure aluminum alloy which is formed by extrusion or casting over slightly more than ½ of the outer peripheral surface of the billet 7. A composite sliding material 9 (extruded product) is produced by extruding both the billet 7 and the protecting material 8 simultaneously.

As occasion demands, the billet 7 and the protecting material 8 may be subjected to heat-treatment before and/or after extrusion, as is the case with the first and the second embodiments. Further, the extruded product is rolled, as necessary, to a thin plate, the side of the pure aluminum or aluminum alloy protecting member 8 being overlapped on and pressure-bonded to the hard support member 5 which serves as a backing metal such as a steel plate so as to produce a composite sliding material 10. Both ends of the extruded product are cut away before extrusion.

Referring to FIG. 5 which shows a fifth embodiment, the manufacturing processes are the same as that of the fourth embodiment except for the configuration and the size of the protecting material 8. In more detail, exactly ½ of the outer peripheral surface of the aluminum alloy base material billet for the sliding portion is covered by the protecting material 8.

TABLE 1

| Sample No. | Al | Cu | Si | Zn | Sn | Pb | Ingredient (wt %) Additive Graphite | MOS$_2$ | PbO | PbF$_2$ | WS$_2$ | Polyimide |
|---|---|---|---|---|---|---|---|---|---|---|---|---|
| 1 | Bal. | 0.8 | 3.0 | 3.5 | 0.07 | 1.0 | — | — | — | — | — | — |
| 2 | " | 0.6 | 2.9 | — | 0.35 | 5.0 | — | — | — | — | — | — |
| 3 | " | 0.6 | 2.9 | — | 0.7 | 10.0 | — | — | — | — | — | — |
| 4 | " | 0.6 | 2.9 | — | 1.0 | 14.0 | — | — | — | — | — | — |
| 5 | " | 0.6 | 2.9 | — | — | — | 5.0 | — | — | — | — | — |
| 6 | " | 3.0 | 10.0 | — | — | — | 5.0 | — | — | — | — | — |
| 7 | " | 0.6 | 2.9 | — | — | — | — | 5.0 | — | — | — | — |
| 8 | " | 0.6 | 2.9 | — | — | — | — | — | 15.0 | — | — | — |
| 9 | " | 0.6 | 2.9 | — | — | — | — | — | — | 10.0 | — | — |
| 10 | " | — | — | — | 1.0 | 18.8 | — | — | — | — | — | — |
| 11 | " | 0.6 | 2.9 | — | 1.0 | 14.0 | — | — | 20.0 | — | — | — |
| 12 | " | 0.6 | 2.9 | — | — | — | — | — | 20.0 | — | — | — |
| 13 | " | 0.6 | 2.9 | — | 0.7 | 10.0 | — | — | 15.0 | — | 10.0 | — |
| 14 | " | 0.6 | 2.9 | — | — | — | — | — | 20.0 | 5.0 | 10.0 | — |
| 15 | " | — | — | — | — | — | — | — | — | — | — | 5.0 |

The conditions for heat-treatment conducted before and/or after extrusion in accordance with the needs of a particular product are also the same as those disclosed in the above-described U.S. Pat. No. 4,361,629.

FIG. 2 shows a second embodiment which is different from the first embodiment only in configuration and in the size of the protecting material 2. Specifically, exactly half of the outer peripheral surface of the aluminum alloy base material billet for the sliding portion is covered by the protecting material 2 and the other manufacturing processes are the same as the first embodiment.

Figure 3:
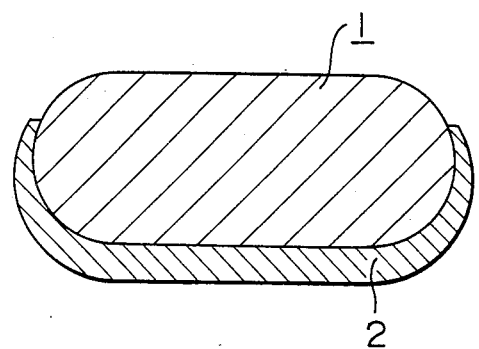

The third embodiment shown in FIG. 3 is in turn different from the second embodiment only in configuration and in the size of the protecting material 2. That is, the protecting member 2 extends over slightly more than ½ of the outer peripheral surface of the aluminum alloy base material billet for the sliding portion, while other manufacturing processes are the same as the second, and hence, the first embodiments.

FIGS. 4(a), 4(b), 4(c), 4(d) and 4(e) show the manufacturing processes of a fourth embodiment. A base material billet for the sliding portion 7 having an ap- The sixth embodiment shown in FIG. 6 is different from the fifth embodiment only in configuration and in the size of the protecting material 8. That is, the protecting member 8 is slightly larger than ½ of the outer peripheral surface of the base material billet for the sliding portion 7 while other manufacturing steps are the same as the fifth, and hence, the fourth embodiments.

FIG. 7(a) and 7(b) show the forming process and coating process, respectively, of a seventh embodiment, which are modifications of the forming process and coating process, respectively, shown in FIGS. 4(a) and 4(b) of the fourth embodiment. Two aluminum alloy sliding materials 7a and 7b of superior sliding characteristics having different compositions are partially covered by the protecting material 8. Other manufacturing steps are the same as the fourth embodiment.

When a composite sliding material in the form of bimetal or trimetal is manufactured by extrusion by a method according to the invention, the surface of the base material billet which is to become a sliding surface of the composite material is exposed during the extrusion. Since the sliding surface of the composite sliding material is always exposed, it becomes possible to dispense with the step of cutting which the prior art requires for the purpose of removing the protecting material which in the prior art act as a temporary surface layer.

Furthermore in the present invention there is necessary no excessive protecting material of pure aluminum alloy. In other words the saving of material costs becomes possible.

The above-described advantages lead to shortening of manufacturing time and lowering of manufacturing costs.

As is obvious from the above description, the method for manufacturing composite sliding material according to the invention has achieved the intended aim and has extremely advantageous practical value.

While there has been described what is at present considered to be the preferred embodiments of the invention, it will be understood that various modifications may be made thereto, and it is intended that the appended claims cover all such modifications as fall within the true spirit and scope of the invention.

What is claimed is:

1. A method of manufacturing a composite sliding material having a sliding portion provided with a sliding surface, comprising the steps of:
   preparing a base material billet, having a transverse cross-section, for said sliding portion;
   covering at least half of the outer peripheral surface of said transverse cross-section of said base material billet by a protecting material but leaving a portion of said outer peripheral surface of said transverse cross-section, said portion which is to become said sliding surface of said composite sliding material, as an exposed portion which is not covered by said protecting material; and
   extruding both said base material billet and said projecting material simultaneously along an axis perpendicular to a plane defined by said transverse cross-section.

2. A method of manufacturing a composite sliding material according to claim 1, wherein said composite sliding material is formed of at least one layer of aluminum bearing material.

3. A method of manufacturing a composite sliding material according to claim 1, wherein said protecting material is formed of pure aluminum or aluminum alloy.

4. A method of manufacturing a composite sliding material according to claim 1, wherein said protecting material serves as an adhesive layer and is pressure-bonded to a hard support member such as steel.

5. A method of manufacturing a composite sliding material according to claim 2, wherein said protecting material is formed of pure aluminum or aluminum alloy.

6. A method of manufacturing a composite sliding material according to claim 5, wherein said protecting material serves as an adhesive layer and is pressure-bonded to a hard support member such as steel.

7. A method of manufacturing a composite sliding material according to claim 2, wherein said protecting material serves as an adhesive layer and is pressure-bonded to a hard support member such as steel.

8. A method of manufacturing a composite sliding material according to claim 3, wherein said protecting material serves as an adhesive layer and is pressure-bonded to a hard support member such as steel.

* * * * *